US011222213B2

(12) United States Patent
Butcher et al.

(10) Patent No.: US 11,222,213 B2
(45) Date of Patent: Jan. 11, 2022

(54) VEHICLE BEHAVIOR DETECTION SYSTEM

(71) Applicant: Verizon Patent and Licensing Inc., Arlington, VA (US)

(72) Inventors: Nicholas D Butcher, Christchurch (NZ); Michiel Alain Hoorens Van Heyningen, Rolleston (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 185 days.

(21) Appl. No.: 16/587,996

(22) Filed: Sep. 30, 2019

(65) Prior Publication Data
US 2021/0097302 A1 Apr. 1, 2021

(51) Int. Cl.
*G06K 9/00* (2006.01)
*G06N 20/00* (2019.01)
*H04N 1/21* (2006.01)
*H04N 1/00* (2006.01)
*G06K 9/62* (2006.01)

(52) U.S. Cl.
CPC ....... *G06K 9/00791* (2013.01); *G06K 9/6267* (2013.01); *G06N 20/00* (2019.01); *H04N 1/00209* (2013.01); *H04N 1/2112* (2013.01); *H04N 2201/0084* (2013.01)

(58) Field of Classification Search
CPC .................. G06K 9/00791; G06K 9/6267
See application file for complete search history.

(56) References Cited

U.S. PATENT DOCUMENTS

2019/0360177 A1* 11/2019 Kiyota ...................... B60R 1/00
2020/0254876 A1* 8/2020 Cordell .............. G06K 9/00845

* cited by examiner

Primary Examiner — Tuan H Nguyen

(57) ABSTRACT

One or more devices may detect an indication of relevant multiple images of an environment of a vehicle. The indication may include at least one of input from a user of the vehicle, a set of instructions, or a threshold measurement by a sensor. The one or more devices may mark the multiple images of the environment as relevant. The one or more devices may identify corresponding types of one or more objects shown in the multiple images. The one or more devices may determine whether the multiple images show an occurrence of an event with respect to the one or more objects. Detection of the event may be based on determining corresponding locations of the one or more objects in relation to each other or to the vehicle. The one or more devices may perform, based on whether the multiple images show the occurrence of the event, one or more actions.

20 Claims, 9 Drawing Sheets

VEHICLE BEHAVIOR DETECTION SYSTEM

BACKGROUND

A dashcam is an onboard camera that continuously records images and/or video through a vehicle's front windshield or rear window. A vehicle may also include one or more integrated cameras that continuously record images and/or video associated with surroundings of the vehicle. Some dashcams and/or integrated cameras can send the images and/or video to another device wirelessly. In addition, some dashcams and/or integrated cameras gather various metrics related to a vehicle with which the dashcams and/or integrated cameras are associated, such as acceleration, deceleration, speed, steering angle, global positioning system (GPS) data, and/or the like.

DETAILED DESCRIPTION OF PREFERRED EMBODIMENTS

Figure 1A:
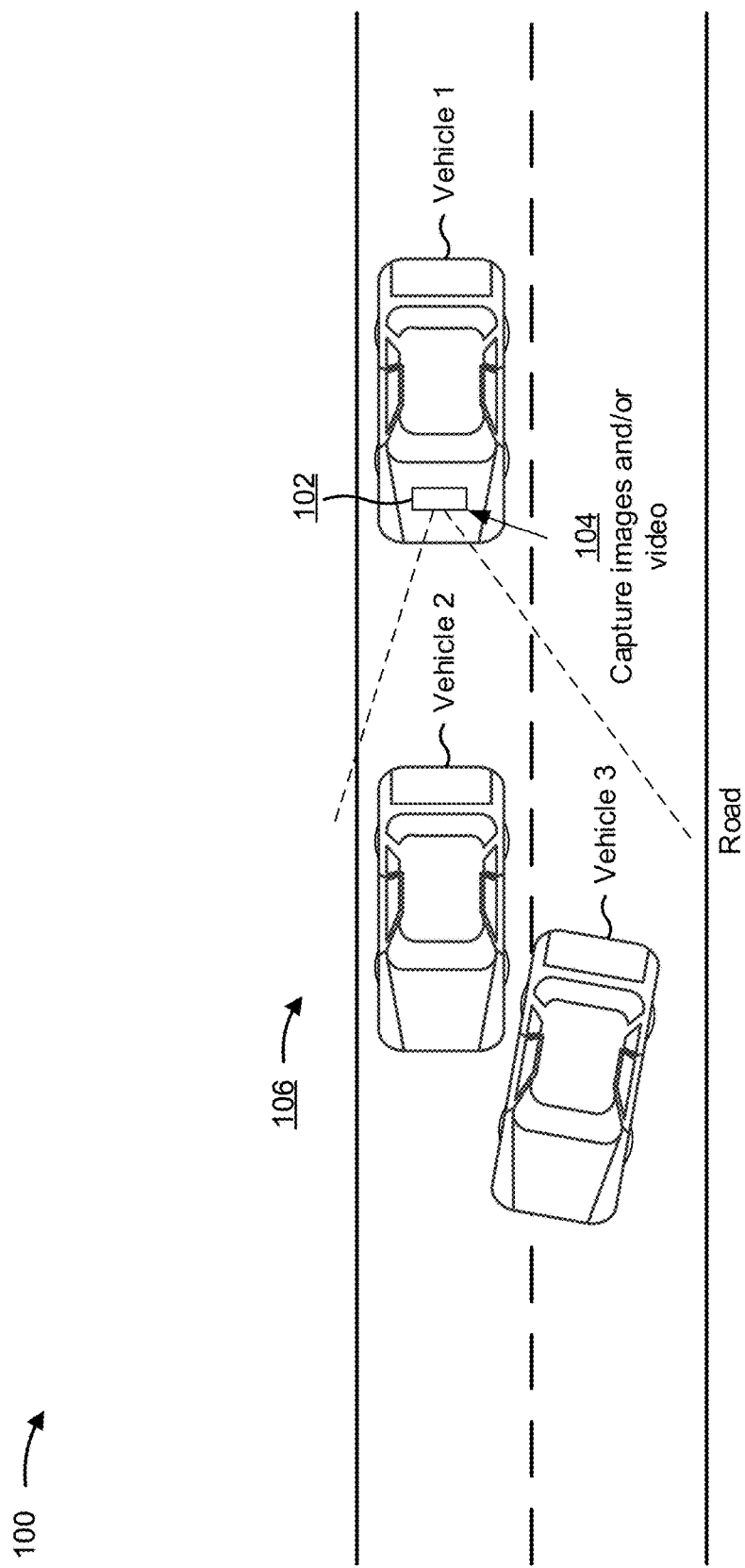
FIGS. 1A-2 are diagrams of one or more example implementations described herein.

The following detailed description of example implementations refers to the accompanying drawings. The same reference numbers in different drawings may identify the same or similar elements.

A vehicle dashcam is installed on a vehicle and is used to record images and/or video of an environment of the vehicle. For example, the dashcam may record the images and/or video continuously while the vehicle is being operated (e.g., from a time that a user of the vehicle starts an engine of the vehicle until the engine is stopped, when vehicle motion is detected, such as during a vehicle crash or a breaking of a window during a theft, and/or the like). The images and/or video can be used to assess a cause of an accident involving the vehicle, to record driving behavior of an operator of the vehicle or of other vehicles, and/or the like. While some dashcams are capable of wirelessly transmitting images and/or video to a centralized location, such uploading consumes significant network resources (e.g., bandwidth). In addition, due to the nature of dashcams continuously gathering images and/or video, many consumer-used dashcams only store images and/or video for a short amount of time (e.g., for the previous few seconds or minutes before recording was stopped), requiring either some trigger or input to prevent deletion of captured images and/or video, as the data volume of the images and/or video would quickly fill memory of the dashcam (or a central server to which the images and/or video are uploaded). Some dashcams may continuously record images and/or video, may store hours, days, and/or the like worth of images and/or video, may flag a portion of the captured images and/or video (e.g., in time period slots) for future analysis based on detection of an event, and/or the like. Procedures for storing and/or accessing images and/or video result in delayed submission of images and/or video to appropriate entities, missed and/or under-reporting of events (such as dangerous driving events), and/or the like. For example, a user of a dashcam may need to wait until the user has an opportunity to connect the dashcam to a user device and/or to access an account via the user device to view and/or submit images and/or video to an entity, such as law enforcement.

Some implementations described herein provide a system that is capable of detecting particular events shown in images and/or video gathered by a camera, such as a dashcam (e.g., in real-time or near real-time), and providing alerts or performing other actions based on detection of the events. For example, a camera may use machine learning models and/or image processing techniques to process the images and/or video to detect an occurrence of an event shown in the images and/or video, such as an instance of dangerous driving, and may notify a centralized platform of detection of the event so that the centralized platform can coordinate notification of an appropriate entity. In this way, the system provides a way to process and/or analyze images and/or video from a camera for event detection without having to send and/or store the images and/or video until an event is detected. In addition, in this way, the system can more accurately detect images and/or video that show an event, thereby reducing an amount of data that needs to be stored, that needs to be sent to a storage location, that needs to be analyzed and/or the like.

This conserves network resources that would otherwise be consumed through transmission of images and/or video that do not show an occurrence of an event, that would otherwise be consumed through transmission of larger quantities of images and/or longer video clips, and/or the like. In addition, by improving an accuracy of detection of events in images and/or video, the system conserves memory resources that would otherwise be consumed storing images and/or video that do not show an occurrence of an event. Further, by improving accuracy of event detection and/or by providing a centralized platform for event reporting, some implementations described herein reduce or eliminate erroneous and/or under-reporting of events, thereby conserving processing resources that would otherwise be consumed as a result of erroneous reporting, thereby improving a safety of routes used by various types of vehicles, and/or the like.

Figure 1B:
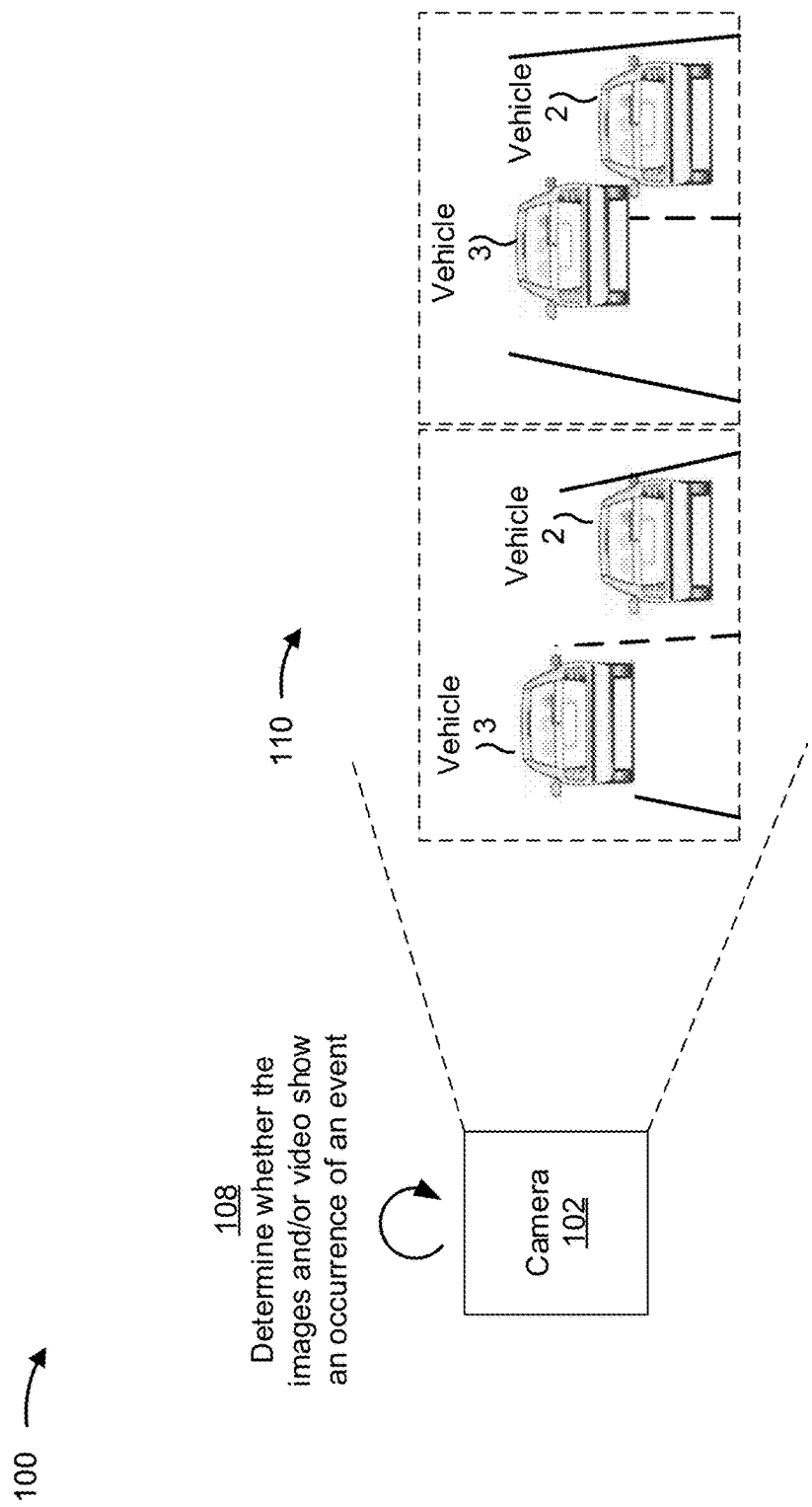
Figure 1C:
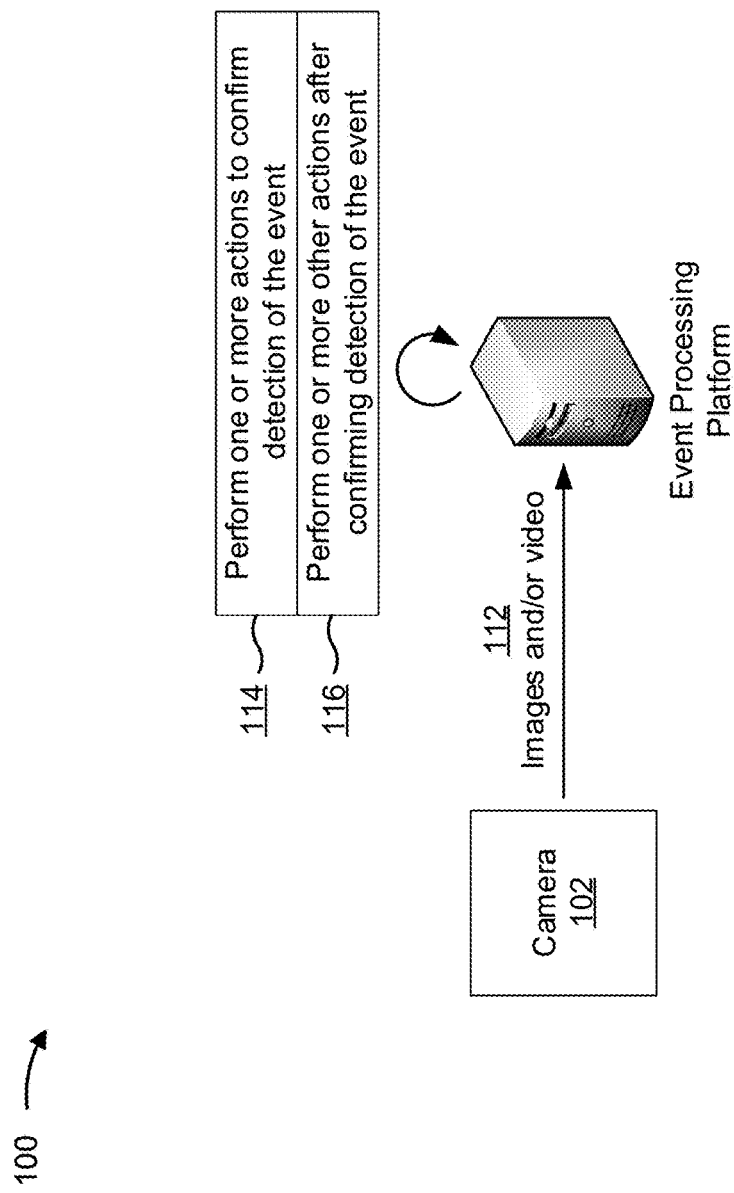

FIGS. 1A-1C are diagrams of one or more example implementations 100 described herein. Implementations 100 may include various vehicles (e.g., vehicles 1 through 3 shown in FIG. 1A), a camera 102 associated with vehicle 1, and an event processing platform (shown in FIG. 1C). Although vehicles 1 through 3 may be, for example, cars, trucks, and/or the like traveling along a road, the implementations described herein apply equally to other types of vehicles traveling along other types of routes, such as boats traveling in a waterway, trains traveling along railroad tracks, planes traveling through the air or that are taxiing, unmanned aerial vehicles (i.e., drone) traversing an aerial route, and/or the like.

As shown in FIG. 1A, vehicle 1 may include camera 102 mounted to the hood of vehicle 1. In some implementations, camera 102 may be mounted to a windshield, a dashboard, a bumper, a roof, a trunk, a door, and/or the like of vehicle 1, integrated into vehicle 1 as part of a manufacturing process, and/or the like. For FIGS. 1A-1C, camera 102 may be oriented such that camera 102 is capable of gathering images and/or video of an area in front of vehicle 1 (e.g., camera 102 may be front-facing with respect to vehicle 1). In some implementations, camera 102 may be oriented in a different manner (e.g., camera 102 may be a rear-facing camera 102, a side-facing camera 102, and/or the like). In addition, vehicle 1 may include one or more additional cameras 102 not shown in or described with respect to FIGS. 1A-1C.

As shown by reference number 104, camera 102 may capture images and/or video of an environment of vehicle 1. For example, camera 102 may capture images and/or video during operation of vehicle 1 (e.g., as vehicle 1 travels along a road) and of an environment in front of vehicle 1. Camera 102 may capture the images and/or video continuously and may store one or more of the images and/or a subset of the video captured (e.g., may store images and/or video captured during the last 30 seconds, or 1 minute). Additionally, or alternatively, camera 102 may capture the images and/or the video based on being triggered to capture the images and/or video. For example, camera 102 may include an accelerometer, or a similar sensor, to measure accelerations and/or decelerations experienced by camera 102 (and/or by vehicle 1), or such information may be captured by an externally connected add-on device (e.g., a vehicle diagnostic and tracking device), a vehicle integrated device (e.g., a non-add-on device), and/or the like. In this case, camera 102 may start capturing images and/or video (and/or saving recorded images and/or video) when the accelerometer detects a measurement that satisfies a threshold and may continue capturing the images and/or video (and/or continuing to store the images and/or video) for a threshold amount of time after the measurement no longer satisfies the threshold. Additionally, or alternatively, camera 102 may capture the images and/or video based on receiving input to capture the images and/or video. For example, camera 102 may capture (and/or or store) images and/or video based on user selection of a button associated with camera 102 (e.g., a physical button associated with camera 102 or a button of a graphical user interface provided for display via a display associated with the camera 102), based on detecting a particular voice command from a user of vehicle 1, based on receiving a set of instructions from another camera 102 and/or a server device (e.g., where the server device has received images from another camera 102 and determines to coordinate capture of images and/or video with camera 102, where the server requests images and/or video from one or more cameras 102 that were within a proximity of a reported event, and/or the like), and/or the like.

As a specific example related to receiving a set of instructions from another camera 102, when a first camera 102 is triggered to start capturing and/or storing images and/or video, the first camera 102 may transmit (e.g., via an event processing platform, described below) a set of instructions to nearby cameras 102 using dedicated short-range communications, device-to-device (D2D) communications, vehicle-to-vehicle (V2V) communications, an intermediate remote platform, and/or the like to cause the nearby cameras 102 to start capturing and/or storing images and/or video. In some cases, camera 102 may determine to not store images and/or video captured unless an event is detected in the images and/or video, as described below.

Camera 102 may gather metadata related to capturing of the images and/or video from various sensors of camera 102, from an on-board system of vehicle 1, and/or the like. For example, camera 102 may gather metadata that identifies a time at which camera 102 captured the images and/or video, a location of vehicle 1 when camera 102 captured the images and/or video, a speed of vehicle 1 when camera 102 captured the images and/or video, an air temperature around vehicle 1 when camera 102 captured the images and/or video, whether a collision avoidance system was engaged when camera 102 captured the images and/or video, an identifier that identifies camera 102 and/or vehicle 1, and/or the like. Camera 102 may store the metadata in association with the images and/or video (e.g., after capturing the images and/or video, based on detection of an event in the images and/or video, and/or the like).

Reference number 106 shows an event of which camera 102 may capture images and/or video. For example, reference number 106 shows vehicle 3 moving from the left lane of the road into the right lane of the road in front of vehicle 2 and into an area partially occupied by vehicle 2 as vehicles 1 through 3 travel along the road. Camera 102 may capture images and/or video of this event in the manner described above.

Turning to FIG. 1B, and as shown by reference number 108, camera 102 may determine whether the images and/or video show an occurrence of an event. For example, camera 102 may determine whether the captured images and/or video show an occurrence of an event after capturing the images and/or video. In the context of a vehicle on a road, an event may include an accident, dangerous driving (e.g., rapid changing of lanes without use of a turn signal, tailgating, and/or the like), presence of an obstruction in a roadway, and/or the like. Possible events that camera 102 may detect (or may be trained to detect) may vary by context (e.g., based on the type of vehicle, the type of route, and/or the like).

Camera 102 may process the images and/or video using an image processing technique in association with determining whether the images and/or video show an occurrence of an event. For example, camera 102 may process the images and/or video using a feature detection technique, a computer vision technique, and/or the like to detect outlines of objects shown in the images and/or video, to classify the objects shown in the images and/or video as particular types of objects, and/or the like. As a specific example related to the event shown by reference number 106, camera 102 may process the images and/or video using the image processing technique to identify a road shown in the images and/or video, different lanes of the road, vehicles 2 and 3 shown in the images and/or video and the positions of vehicles 2 and 3 on the road, motion of vehicles 2 and 3 in relation to each other (e.g., motion of vehicle 3 from the left lane of the road to the right lane of the road into an area occupied by vehicle 2), and/or the like. Camera 102 may determine the motion of vehicles 2 and 3 based on motion shown in the images and/or video (e.g., by analyzing relative positions of vehicles 2 and 3 to each other and to the road across different images or frames). Additionally, or alternatively, camera 102 may use telemetry data (e.g., data that identifies a speed, a location, a direction of movement, and/or the like of vehicles 1 and 2) at the time the images and/or video were captured. For example, the camera 102 may receive the telemetry data from corresponding cameras 102 of vehicles 2 and 3, via a system of vehicle 1 that receives the telemetry data from vehicles 2 and 3 based on being within a threshold proximity of vehicles 2 and 3, and/or the like.

In some implementations, the determination of an event or a non-event may be based on the data (e.g., other than data generated by the image analysis), such as data received from braking sensors, accelerometers, radar sensors, collision sensors, airbag sensor, and/or the like, and the other data may be provided to the event processing platform.

Additionally, or alternatively, camera 102 may use an image analysis model that is trained via machine learning (e.g., referred to herein as a machine learning model) to process the images and/or video in association with determining whether the images and/or video show an occurrence of an event. For example, camera 102 may use the machine learning model to detect objects shown in the images and/or video, movements of the objects shown in the images and/or video (e.g., including a speed of the objects based on pixel size changes or movement across multiple images or frames of video and/or based on data that identifies a speed of vehicle 1, and/or the like), and/or the like. Additionally, or alternatively, and as another example, camera 102 may use a machine learning model to classify movement of the objects identified in the images and/or video as particular types of events. For example, classification of the movement (e.g., into classifications such as a lane change, speeding, swerving, and/or the like) may indicate an occurrence (or non-occurrence) of an event.

A machine learning model described herein may have been trained to analyze images and/or video to identify types of objects shown in captured images and/or video, to determine whether the images and/or video shows an occurrence of an event, and/or the like. For example, the machine learning model may have been trained to identify an object as a vehicle (and/or as a particular type of vehicle) or as a non-vehicle, may have been trained to identify an event such as a collision between two or more objects shown in the images and/or video, and/or the like.

In some implementations, the machine learning model may have been trained on a training set of data. For example, the machine learning model may have been trained on a training set of data that includes various sets of images and/or video and information that identifies objects shown in the images and/or video (and locations of the objects within the images and/or video), that identifies whether the images and/or video show an occurrence of an event (and/or a particular type of event in some cases), and/or the like. Camera 102 may utilize multiple machine learning models that are associated with different contexts of usage of camera 102. For example, the machine learning model may have been trained to identify objects, to detect events, and/or the like in images and/or video depending on an intended deployment scenario of camera 102 (e.g., a camera 102 to be deployed on a car may be trained to identify trucks, cars, bicycles, motorcycles, and/or the like, but may not be trained to identify various types of watercraft or aircraft). This improves an accuracy of identifying types of objects shown in images and/or video and/or conserves memory resources and/or processing resources that would otherwise be consumed as a result of a non-contextualized training of the machine learning model.

Training of the machine learning model may include portioning a set of images and/or video into a training set, a validation set, a test set, and/or the like. Training the machine learning model may include using, for example, a factorization machine, a random forest, gradient boosting, and/or the like, on the training set of the image/video data. The training set of data may be object and/or event specific (e.g., specific for the objects and/or events that the machine learning model is expected to detect).

Training of the machine learning model may include using supervised training. For example, a user may manually classify data to train the machine learning model. In another example, users may provide information indicating dangerous driving events, which may be utilized as training data. This may increase an accuracy of training of the machine learning model and/or may reduce an amount of time needed to train the machine learning model.

In some implementations, training of the machine learning model may include use of a factorization machine technique. For example, the factorization machine technique may train the machine learning model on features included in a training set of data. Additionally, or alternatively, training of the machine learning model may include using a random forest technique. For example, the random forest technique may train the machine learning model by constructing multiple decision trees from the training set of data. Additionally, or alternatively, training of the machine learning model may include using a gradient boosting technique. For example, the gradient boosting technique may generate a prediction model based on the training set of data.

Training of the machine learning model may include using a logistic regression classification technique to determine a categorical outcome (e.g., particular types of objects shown in images and/or video, whether the images and/or video show an occurrence of an event, and/or the like). Additionally, or alternatively, training of the machine learning model may include using a naïve Bayesian classifier technique. In this case, the training may include performing binary recursive partitioning to split data of a minimum feature set into partitions and/or branches, and using the partitions and/or branches to perform predictions (e.g., that images and/or video show particular types of objects, that the images and/or video show an occurrence of an event, and/or the like). Use of recursive partitioning may reduce utilization of computing resources relative to manual, linear sorting and analysis of data points, thereby enabling use of thousands, millions, or billions of data points to train a model, which may result in a more accurate model than using fewer data points.

Training of the machine learning model may include using a support vector machine (SVM) classifier technique to generate a non-linear boundary between data points in the training set. In this case, the non-linear boundary is used to classify test data (e.g., images and/or video) into a particular class (e.g., a class that indicates that the images and/or video show a particular type of object, that the images and/or video show an occurrence of an event, and/or the like).

In some implementations, camera 102 may train the machine learning model in the manner described above. Alternatively, another device, such as the event processing platform described below, may train a machine learning model and the other device may provide the trained machine learning model to camera 102. For example, the other device may pre-load camera 102 with the trained machine learning model, may receive a request from camera 102 for the trained machine learning model, and/or the like. The other device may perform a lookup to identify a machine learning model to be provided to camera 102. For example, the other device may perform a lookup of a machine learning model associated with a vehicle on which camera 102 is to be installed, types of events that camera 102 is to be used to detect, and/or the like. This increases an accuracy of use of a machine learning model by tailoring use of the machine learning model to particular contexts.

In some implementations, output from the machine learning model may identify types of objects shown in images and/or video, whether the images and/or video show an occurrence of an event, a type of event shown in the images and/or video, and/or the like. Additionally, or alternatively, output from the machine learning model may include a score that identifies a confidence level associated with a result of using the machine learning model to process the images and/or video. For example, the machine learning model may determine a score for identification of an object, for detection of an event, and/or the like based on a degree to which an identified object and/or a detected event matches data on which the machine learning model was trained, a degree to which an identified object and/or a detected event matches one or more classifications into which the machine learning model is trained to classify detected objects and/or events, and/or the like. Additionally, or alternatively, the score may indicate a priority level associated with a detected event. For example, different types of events may be associated with different priority levels (e.g., a collision event may be associated with a higher priority level than a speeding event in a roadway context). In some cases, the priority level associated with the score may control actions performed by camera 102 and/or the event processing platform, as described in more detail elsewhere herein.

Reference number 110 shows example images and/or video frames that camera 102 may have captured. In this case, camera 102 may identify the road, vehicle 2, and vehicle 3 in the images and/or video using an image processing technique and/or a machine learning model. In addition, camera 102 may identify movements and/or actions of vehicle 2 and/or vehicle 3. For example, camera 102 may detect movement of vehicle 3 from the left lane of the road into the right lane of the road and into an area occupied by vehicle 2, may detect swerving of vehicle 2, may detect braking (through speed detection or brake light activation) of vehicle 2, and/or the like. As described above, camera 102 may perform these detections based on telemetry data from vehicle 2 and/or vehicle 3. For example, camera 102 may detect movement of vehicle 3 from the left lane into the right lane from the images and/or video and may use telemetry data to determine that the movement of vehicle 3 was into an area partially occupied by vehicle 2. Camera 102 may classify movement of vehicle 2 and/or vehicle 3. For example, camera 102 may classify movement of vehicle 3 as a potentially dangerous lane change and may classify movement of vehicle 2 as not being a potentially dangerous movement.

In some implementations, camera 102 may request input of confirmation of a detected event. For example, camera 102 may output information via an output component of camera 102 that indicates detection of an event in images and/or video captured by camera 102 and may request input from a user of vehicle 1 if the user witnessed a possible event at the time that the images and/or video were captured. In some cases, camera 102 may determine to wait to perform this request until vehicle 1 is stopped, until an engine of vehicle 1 is powered off, and/or the like. In these cases, camera 1 may provide a summary of events that were detected between a previous request for confirmation and the current request for confirmation and may provide images and/or video for display in association with the request for confirmation. The confirmation may be generated by a driver, a company manager in an office, a staff of various agencies charged with inspecting such events, and/or the like. The confirmation may constitute a separate label and/or feature (e.g., for training data) associated an item of content.

Camera 102 may detect an occurrence of an event based on input from a user of vehicle 1. For example, as camera 102 is capturing images and/or video, a user of vehicle 1 may provide input to camera 102 to indicate a possible occurrence of an event. As a specific example, a user of vehicle 1 may select a button associated with camera 102, may input a voice command, and/or the like to indicate to camera 102 a possible occurrence of an event. Camera 102 may process the images and/or video captured within a threshold amount of time before and/or after receiving the input using an image processing technique and/or a machine learning model, in a manner similar to that described above, to confirm the occurrence of the possible event. In some implementations, input from a user that indicates an occurrence of an event may cause camera 102 to provide images and/or video to the event processing platform without first processing the images and/or video in the manner described herein. This conserves processing resources of camera 102 that would otherwise be consumed processing the images and/or video prior to providing the images and/or video to the event processing platform.

Camera 102 may classify a detected event into a classification. For example, a classification may identify particular types of events, severities of the events, and/or the like. Camera 102 may provide metadata that identifies the classification to the event processing platform in association with providing the images and/or video to the event processing platform, as described below.

Turning to FIG. 1C, and as shown by reference number 112, camera 102 may provide the images and/or video associated with a detected event to the event processing platform. For example, camera 102 may provide the images and/or video after detecting an event in the images and/or video. Camera 102 may reduce the quantity of images and/or video frames of the video from that which camera 102 initially captured to those that were captured within a threshold amount of time of a detected event. This reduces the amount of data that camera 102 has to provide to the event processing platform, which conserves network resources (e.g., bandwidth). Camera 102 may determine to not send images and/or video if camera 102 fails to detect an event in the images and/or video and may discard the images and/or video. This conserves processing resources and network resources that would otherwise be consumed sending images and/or video that do not show an event and/or conserves memory resources of camera 102 that would otherwise be consumed storing images and/or video that do not show an occurrence of an event.

In some implementations, camera 102 may perform various actions related to securing and/or confirming an authenticity of the images and/or video prior to providing the images and/or video to the event processing platform. For example, camera 102 may apply a watermark to the images and/or video, may digitally sign the images and/or video with a unique identifier, may generate, using a hash function, a unique hash of the images and/or video, and/or the like. The event processing platform may use this information to confirm an authenticity of the images and/or video, to verify whether the images and/or video have been altered (e.g., the event processing platform may determine a hash of the images and/or video after receiving the images and/or video and may compare the hash to another hash provided by camera 102), and/or the like. This improves the security of the images and/or video and improves reliability of the images and/or video. Reliability of the images and/or video may be useful if used in conjunction with inputs from a vehicle engine control module (ECM), to determine more reliable speeds form an odometer (e.g., as opposed to relying on GPS from the camera to deduce speed), and/or the like.

In some implementations, the actions that camera 102 performs may be controlled by a score output by the machine learning model that camera 102 used to process the images and/or video. For example, the score may indicate a priority level associated with a detected event. In this case, if the score satisfies a threshold, camera 102 may provide the images and/or video to the event processing platform within a threshold amount of time after detecting an occurrence of an event shown in the images and/or video, regardless of whether camera 102 is connected to a metered or an unmetered network, may secure the images and/or video in the manner described above, and/or the like. Conversely, if the score fails to satisfy a threshold, camera 102 may determine to not provide the images and/or video to the event processing platform until camera 102 is connected to an un-metered network, may determine to not secure the images and/or video, and/or the like.

As shown by reference number 114, the event processing platform may perform one or more actions to confirm detection of the event in the images and/or video by camera 102. For example, the event processing platform may re-process the images and/or video using an image processing technique and/or a machine learning model similar to that described above. Continuing with the previous example, the event processing platform may determine whether a result of processing the images and/or video using the image processing technique and/or the machine learning model matches a result of processing by camera 102. The event processing platform may confirm detection of the event when a result of the comparison indicates a match. In some implementations, the event processing platform may retain images and/or video locally for as long as possible in case the images and/or video include footage later determined to be relevant (e.g., but not initially flagged as relevant), so that the images and/or video are available for corroborating material and/or model training data.

Additionally, or alternatively, the event processing platform may process images and/or video from other cameras 102 associated with other vehicles to confirm detection of the event. For example, the event processing platform may process images and/or video from other cameras 102 that were in a threshold proximity of camera 102 (as determined from metadata) and that other cameras 102 have indicated an event. Continuing with the previous example, the event processing platform may perform a lookup of information that identifies a location of camera 102 to determine whether any other cameras 102 were within a threshold proximity of camera 102 at the time the images and/or video were captured, and may request and/or process images and/or video from the other cameras 102. In this case, the event processing platform may send a set of instructions to other cameras 102 within a threshold proximity of camera 102 associated with vehicle 1, to cause the other cameras 102 to process and/or provide images and/or video for a particular time period around the detected event to the event processing platform so that the event processing platform can perform actions to confirm detection of an event in images and/or video from camera 102. In some implementations, the event processing platform may not utilize footage from nearby cameras to confirm occurrence of an event, but may utilize such footage as detail and/or evidence associated with the event for downstream consumers (e.g., insurance investigators).

Additionally, or alternatively, the event processing platform may send a message to a user device associated with a user of camera 102, associated with vehicle 1, and/or the like to confirm detection of the event. For example, the message may be a text message, an email, and/or the like and the message may include the images and/or video that show the event. In this case, the message may request user input to the user device to confirm or reject confirmation of the occurrence of the detected event. Additionally, or alternatively, the event processing platform may populate an account of an individual with the images and/or video so that the individual can review the images and/or the video to confirm the presence of the detected event.

The event processing platform may store the images and/or video, metadata associated with the images and/or video, information that identifies a detected event in the images and/or video, and/or the like in a data structure. The event processing platform may use some of this information to update an image processing technique and/or a machine learning model described herein (e.g., by using some of the information to re-train the image processing technique and/or the machine learning model). The event processing platform may install, on camera 102, software related to using the updated image processing technique (e.g., by providing the updated software to camera 102) and/or may provide an updated machine learning model to camera 102. This improves an accuracy of future event detections through iterative re-training and updating of operations of camera 102 related to processing images and/or video.

As shown by reference number 116, the event processing platform may perform one or more other actions after confirming detection of the event. For example, the event processing platform may perform one or more other actions depending on whether the event processing platform confirms detection of the event.

If the event processing platform confirms detection of the event, the event processing platform may send a message to one or more other devices. For example, some of the one or more other devices may be associated with various entities, such as a law enforcement entity, a department of transportation entity, a corresponding owner and/or operator of one or more of the vehicles associated with a detected event, and/or the like. In some implementations, the message may include a ticket or a citation based on the event. Additionally, or alternatively, the event processing platform may dispatch a vehicle (e.g., an autonomous vehicle, an unmanned aerial vehicle, and/or the like) to a location of the event by sending a set of instructions to the vehicle (or to a device that controls dispatch of the vehicle).

The particular entity or device to which the event processing platform sends the message may be based on various factors, such as the type of event detected, metadata associated with the images and/or video, device and/or group specific handling rules (e.g., a particular operator of devices within a fleet may wish for all instances of detected dangerous driving to be submitted directly to traffic authorities, another operator may prefer an internal review followed by manual submissions, and/or the like), and/or the like. In some implementations, the message may include the images and/or video, and the event processing platform may partially anonymize the images and/or video prior to including the images and/or video in the message. For example, the event processing platform may use an image processing technique to detect and/or obscure faces of individuals not associated with the detected event, to detect and/or obscure vehicle identifiers (e.g., license plates) of vehicles not associated with the detected event, and/or the like. Additionally, or alternatively, the event processing platform may remove metadata from being associated with the images and/or video prior to including the images and/or video in the message. The amount of anonymization and/or the amount of metadata that is included in a message may be configurable based the particular entity for which the message is intended. This maintains a privacy of information that is not needed by the entity.

In some implementations, the entity may perform an investigation of the detected event, such as to determine the particular nature of the event, whether the event was accurately detected, and/or the like. The entity may then generate and store information in a data structure that identifies a result of the investigation. The event processing platform may access this information and may use the information to update an image processing technique and/or a machine learning technique used by the event processing platform and/or camera 102, in a manner similar to that described elsewhere herein.

In some implementations, the event processing platform may aggregate information related to various detected events. The event processing platform may generate a report that includes information related to one or more events during a time period and may output the report for display after generating the report. In some implementations, the event processing platform may perform various analytics on the aggregated information, such as analytics related to detected events by location, date, vehicle, time of day or day of the week, and/or the like. The event processing platform may include a result of performing the various analytics in a report.

In some implementations, the event processing platform may provide a notification to a user device within a proximity of the detected event, such as a notification to warn a user of the user device of the event. Additionally, or alternatively, the event processing platform may populate a virtual map with an icon that identifies a location of the detected event. Additionally, or alternatively, the event processing platform may identify a vehicle that is on a path to an area of a detected event (e.g., based on information from a navigation system or application associated with the vehicle) and may send a set of instructions to the vehicle to re-route the vehicle around the detected event.

In some implementations, the event processing platform may determine a score for a detected event. For example, the score may indicate a severity of the event, a type of the event, and/or the like and may perform one or more of the above actions based on whether the score satisfies a threshold.

In this way, some implementations described herein provide a system (e.g., of camera 102 and the event processing platform) that is capable of capturing images and/or video of an environment of a vehicle and processing the images and/or video to detect an occurrence of an event. In some cases, after detection of an event, the system may notify various entities of detection of the event. This provides an automated and accurate way to detect and/or report events that occur in the environment of the vehicle. This reduces or eliminates underreporting and/or mis-reporting of such events. In addition, some implementations described herein reduce or eliminate storing and/or providing of images and/or video that do not show an occurrence of an event, thereby conserving memory resources of various devices of the system, conserving network resources between various devices of the system, and/or the like.

As indicated above, FIGS. 1A-1C are provided as one or more examples. Other examples can differ from what is described with regard to FIGS. 1A-1C.

Figure 2:
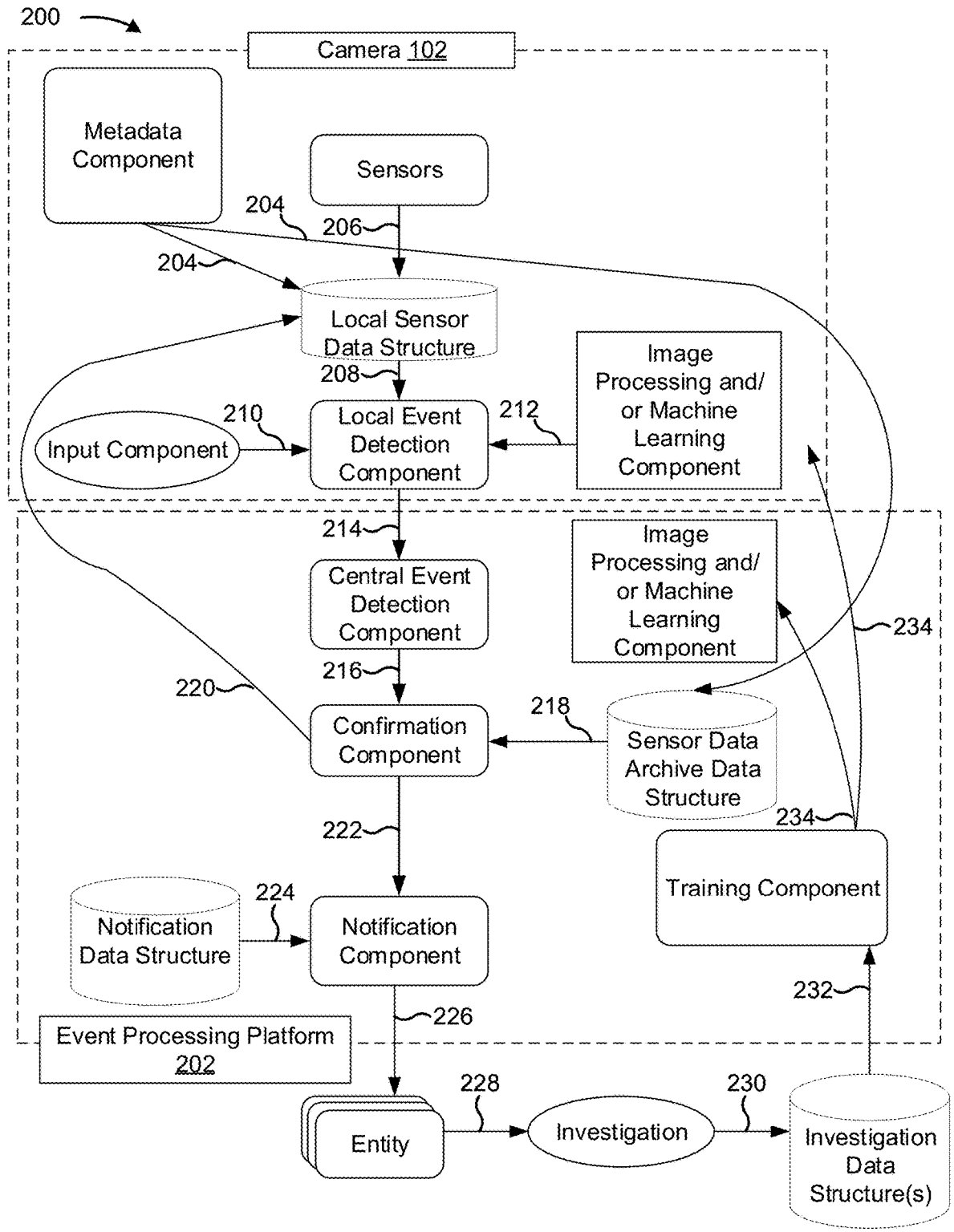

FIG. 2 is a diagram of an example implementation 200 described herein. FIG. 2 shows interactions of various devices of a system described herein. As shown in FIG. 2, implementation 200 includes a camera 102, an event processing platform 202, various entities, and investigation data structure(s) associated with the various entities.

As shown in FIG. 2, camera 102 may include a metadata component. The metadata component may gather metadata associated with capturing of images and/or video, as described elsewhere herein. As shown by reference numbers 204, the metadata component may provide metadata to a local sensor data structure of camera 102 and/or to a sensor data archive data structure associated with event processing platform 202 to store the metadata. As further shown in FIG. 2, camera 102 may include various sensors, as described elsewhere herein. As shown by reference number 206, the sensors may store measurements or other metadata in the local sensor data structure.

As further shown in FIG. 2, camera 102 may include a local event detection component. The local event detection component may process images and/or video, metadata, sensor measurements, and/or the like to detect an occurrence of an event in the images and/or video in a manner similar to that described elsewhere herein. For example, and as shown by reference number 208, the local event detection component may use data stored in the local sensor data structure to perform event detection. As shown by reference number 210, the local event detection component may process the images and/or video, the metadata, the sensor data, and/or the like based on receiving input from an input component of the camera 102. Additionally, or alternatively, and as shown by reference number 212, the local event detection component may receive output from an image processing and/or machine learning component to detect an occurrence of an event shown in the images and/or video.

As shown by reference number 214, the local event detection component may provide images and/or video to a central event detection component of event processing platform 202. For example, the local event detection component may provide the images and/or video to event processing platform 202 in a manner similar to that described elsewhere herein. As shown by reference number 216, the central event detection component may utilize a confirmation component to confirm detection of the event. For example, and as shown by reference number 218, the confirmation component may determine whether patterns in the images and/or video, the sensor data, the metadata, and/or the like from camera 102 match historical patterns of historical data stored in a sensor data archive data structure of event processing platform 202. As another example, and as shown by reference number 220, the confirmation component may determine whether images and/or video, sensor data, metadata, and/or the like received from camera 102 are authentic by determining a match to data stored in the local sensor data structure. As shown by reference number 222, the confirmation component may notify a notification component of confirmation of the detected event.

As shown by reference number 224, if event processing platform 202 detects and confirms detection of an event, a notification component of event processing platform 202 may use information stored in a notification data structure to determine a set of entities to notify regarding the detection of the event. As shown by reference number 226, the notification component may notify the set of entities (e.g., by sending a message to corresponding devices associated with the set of entities). The set of entities may perform various actions after receiving a notification from the notification component. For example, and as shown by reference number 228, the set of entities may perform corresponding investigations of the event, such as to confirm an accurate detection of the event.

As shown by reference number 230, the set of entities may store information that identifies results of the corresponding investigations in investigation data structure(s). As shown by reference number 232, a training component of event processing platform 202 may use this information to update an image processing technique and/or a machine learning model associated with detecting events. As shown by reference numbers 234, the training component may provide updated software and/or an updated machine learning model to an image processing and/or machine learning component of event processing platform 202 and/or to the image processing and/or machine learning component of camera 102.

As indicated above, FIG. 2 is provided as an example. Other examples can differ from what is described with regard to FIG. 2.

Figure 3:
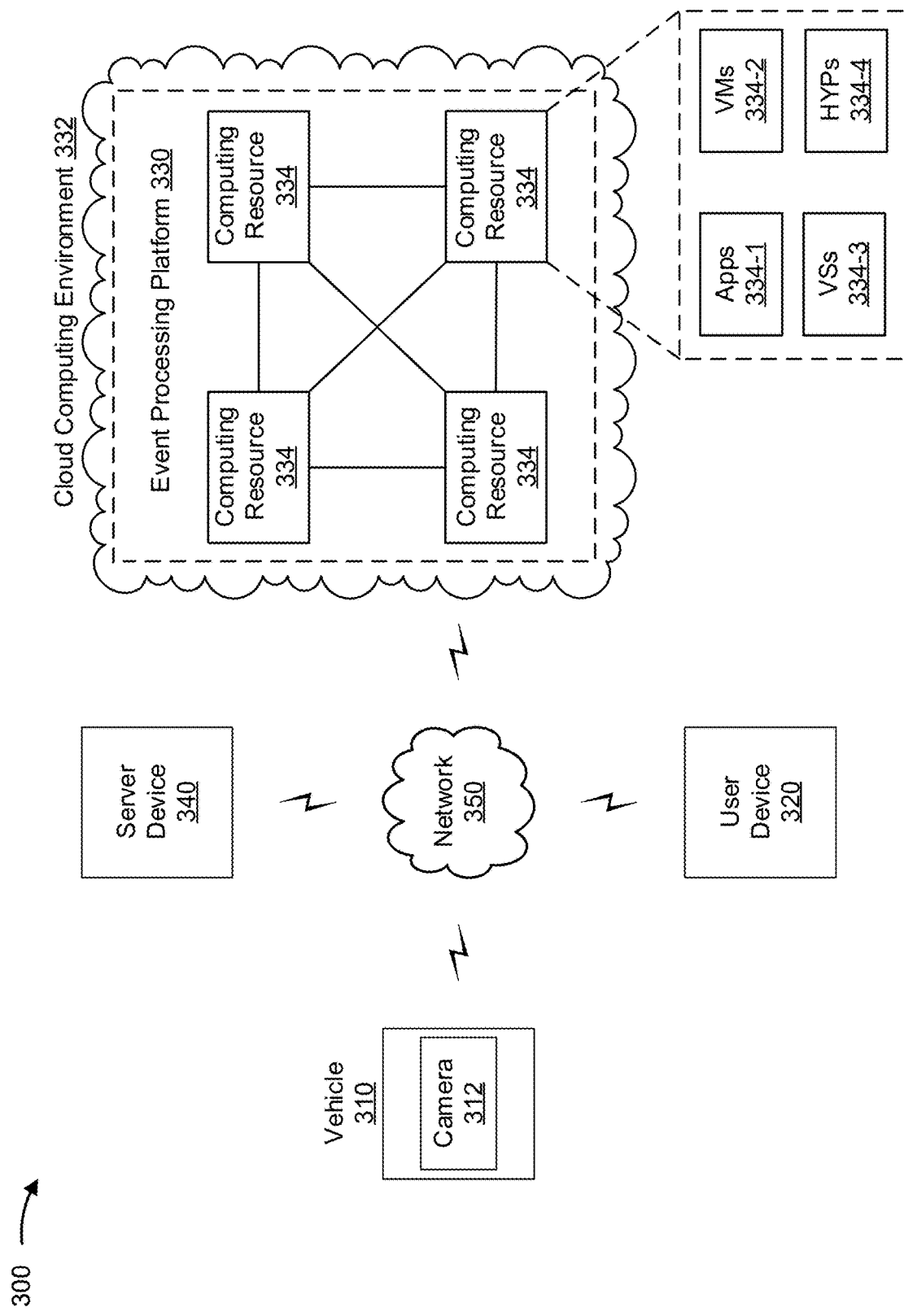
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a vehicle 310 that includes a camera 312, a user device 320, an event processing platform 330 hosted within a cloud computing environment 332 that includes a set of computing resources 334, a server device 340, and a network 350. Devices of environment 300 may interconnect via wired connections, wireless connections, or a combination of wired and wireless connections.

Vehicle 310 includes a car, a truck, a bicycle, a motorcycle, an airplane, a boat, a train, and/or the like depending on context. Camera 312 includes one or more devices capable of capturing images and/or video of an environment of vehicle 310. For example, camera 312 may include a digital camera, a dashcam, and/or a similar device. In some implementations, camera 312 may capture images and/or video and may process the images and/or video to detect an occurrence of an event, as described elsewhere herein.

User device 320 includes one or more devices capable of receiving, generating, storing, processing, and/or providing data described herein. For example, user device 320 may include a mobile phone (e.g., a smart phone or a radiotelephone), a laptop computer, a tablet computer, a handheld computer, a gaming device, a wearable communication device (e.g., a smart wristwatch or a pair of smart eyeglasses), a desktop computer, or a similar type of device. In some implementations, user device 320 may receive, from event processing platform 330, information related to detection of an event, as described elsewhere herein.

Event processing platform 330 includes one or more devices capable of receiving, generating, storing, processing, and/or providing data described herein. For example, event processing platform 330 may include a cloud server or a group of cloud servers. In some implementations, event processing platform 330 may be designed to be modular such that certain software components can be swapped in or out depending on a particular need. As such, event processing platform 330 may be easily and/or quickly reconfigured for different uses.

In some implementations, as shown in FIG. 3, event processing platform 330 may be hosted in cloud computing environment 332. Notably, while implementations described herein describe event processing platform 330 as being hosted in cloud computing environment 332, in some implementations, event processing platform 330 may not be cloud-based (i.e., may be implemented outside of a cloud computing environment) or may be partially cloud-based.

Cloud computing environment 332 includes an environment that hosts event processing platform 330. Cloud computing environment 332 may provide computation, software, data access, storage, and/or other services that do not require end-user knowledge of a physical location and configuration of a system and/or a device that hosts event processing platform 330. As shown, cloud computing environment 332 may include a group of computing resources 334 (referred to collectively as "computing resources 334" and individually as "computing resource 334").

Computing resource 334 includes one or more personal computers, workstation computers, server devices, or another type of computation and/or communication device. In some implementations, computing resource 334 may host event processing platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 may include a group of cloud resources, such as one or more applications ("APPs") 334-1, one or more virtual machines ("VMs") 334-2, one or more virtualized storages ("VSs") 334-3, or one or more hypervisors ("HYPs") 334-4.

Application 334-1 includes one or more software applications that may be provided to or accessed by one or more devices of environment 300. Application 334-1 may eliminate a need to install and execute the software applications on devices of environment 300. For example, application 334-1 may include software associated with event processing platform 330 and/or any other software capable of being provided via cloud computing environment 332. In some implementations, one application 334-1 may send/receive information to/from one or more other applications 334-1, via virtual machine 334-2. In some implementations, application 334-1 may include a software application associated with one or more databases and/or operating systems. For example, application 334-1 may include an enterprise application, a functional application, an analytics application, and/or the like.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of user device 320), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 provides hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Server device 340 includes one or more devices capable of receiving, generating storing, processing, and/or providing data described herein. For example, server device 340 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 340 may include a communication interface that allows server device 340 to receive information from and/or transmit information to other devices in environment 300. In some implementations, server device 340 may be a physical device implemented within a housing, such as a chassis. In some implementations, server device 340 may be a virtual device implemented by one or more computer devices of a cloud computing environment or a data center. In some implementations, server device 340 may receive, from event processing platform 330, information that identifies a result of processing images and/or video, as described elsewhere herein.

Network 350 includes one or more wired and/or wireless networks. For example, network 350 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
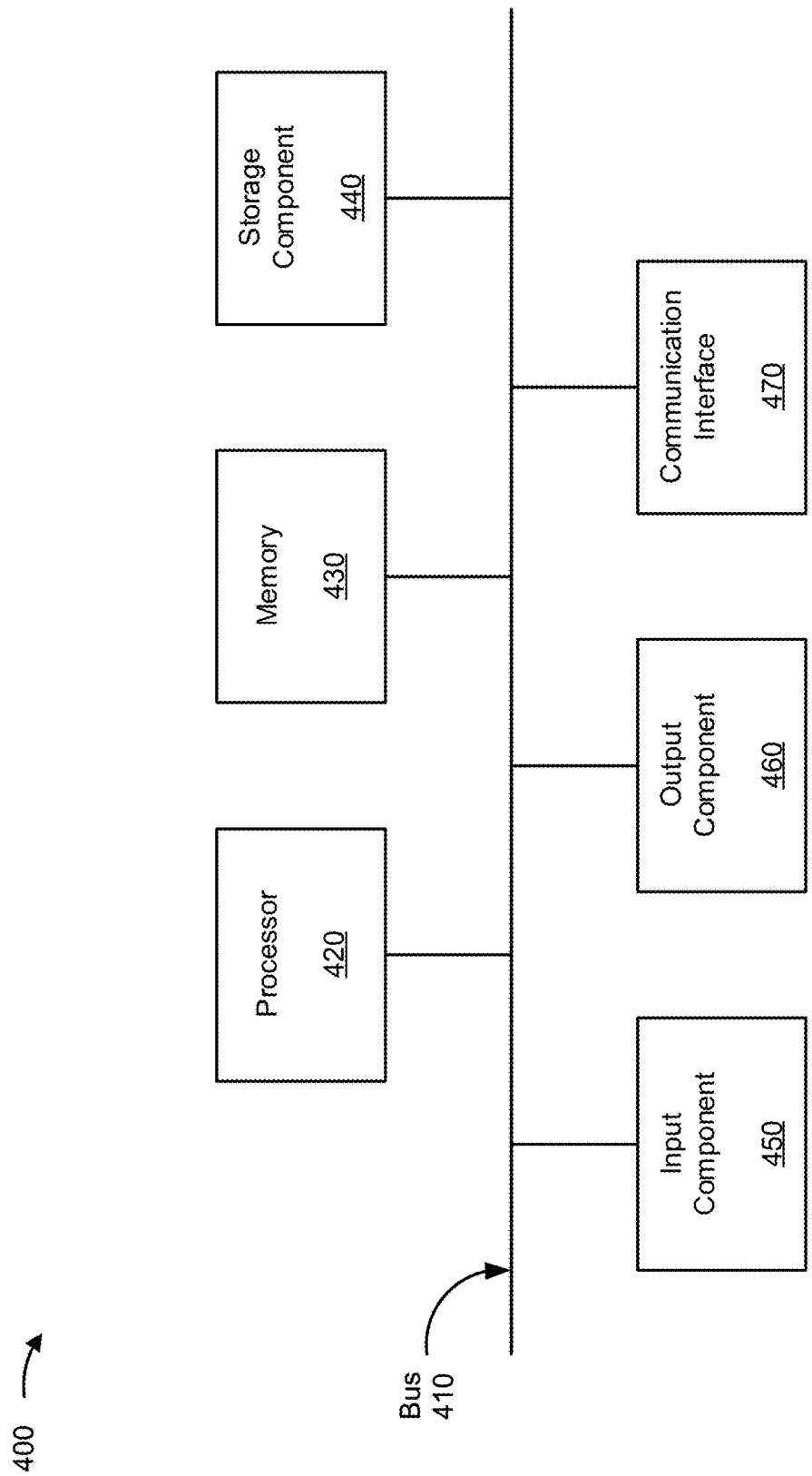
FIG. 4 is a diagram of example components of one or more devices of FIG. 3.

FIG. 4 is a diagram of example components of a device 400. Device 400 may correspond vehicle 310, camera 312, user device 320, event processing platform 330, computing resource 334, and/or server device 340. In some implementations vehicle 310, camera 312, user device 320, event processing platform 330, computing resource 334, and/or server device 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a universal serial bus (USB) stick, a secure digital (SD) card, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
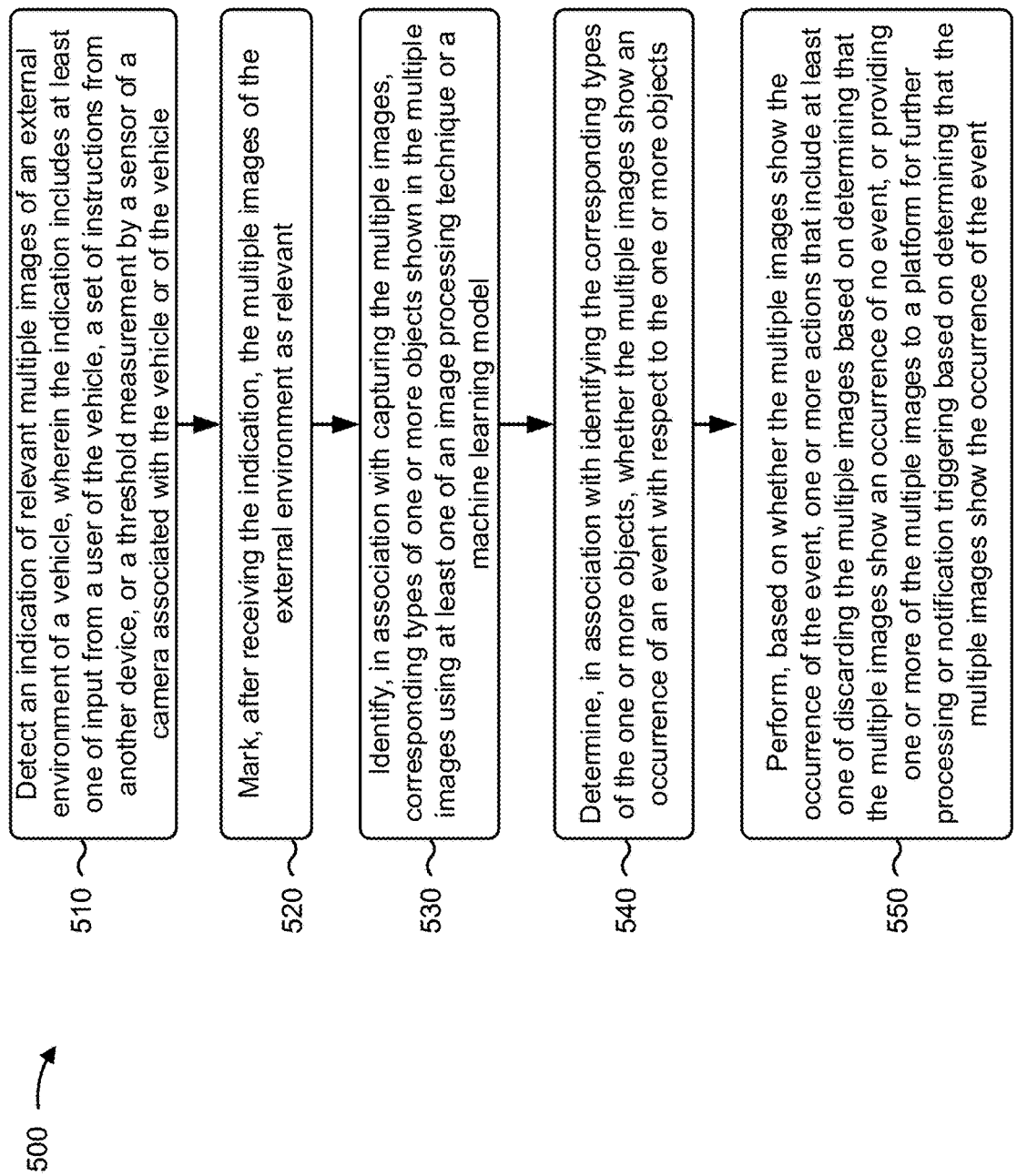
FIGS. 5-7 are flow charts of one or more example processes related to a vehicle behavior detection system.

FIG. 5 is a flow chart of an example process 500 related to a vehicle behavior detection system. In some implementations, one or more process blocks of FIG. 5 may be performed by a camera (e.g., camera 102, camera 312, and/or the like). In some implementations, one or more process blocks of FIG. 5 may be performed by another device or a group of devices separate from or including the camera, such as a vehicle (e.g., vehicle 310), a user device (e.g., user device 320), an event processing platform (e.g., event processing platform 202, event processing platform 330, and/or the like), a server device (e.g., server device 340), and/or the like.

As shown in FIG. 5, process 500 may include detecting an indication of relevant multiple images of an external environment of a vehicle, wherein the indication includes at least one of input from a user of the vehicle, a set of instructions from another device, or a threshold measurement by a sensor of a camera associated with the vehicle or of the vehicle (block 510). For example, the camera (e.g., using processor 420, input component 450, communication interface 470, and/or the like) may detect an indication of relevant multiple images of an external environment of a vehicle, as described above. In some implementations, the indication includes at least one of input from a user of the vehicle, a set of instructions from another device, or a threshold measurement by a sensor of the camera associated with the vehicle or of the vehicle.

As further shown in FIG. 5, process 500 may include marking, after receiving the indication, the multiple images of the external environment as relevant (block 520). For example, the camera (e.g., using processor 420, input component 450, and/or the like) may mark, after receiving the indication, the multiple images of the external environment as relevant, as described above.

As further shown in FIG. 5, process 500 may include identifying, in association with capturing the multiple images, corresponding types of one or more objects shown in the multiple images using at least one of an image processing technique or a machine learning model (block 530). For example, the camera (e.g., using processor 420 and/or the like) may identify, in association with capturing the multiple images, corresponding types of one or more objects shown in the multiple images using at least one of an image processing technique or a machine learning model, as described above.

As further shown in FIG. 5, process 500 may include determining, in association with identifying the corresponding types of the one or more objects, whether the multiple images show an occurrence of an event with respect to the one or more objects (block 540). For example, the camera (e.g., using processor 420 and/or the like) may determine, in association with identifying the corresponding types of the one or more objects, whether the multiple images show an occurrence of an event with respect to the one or more objects, as described above.

As further shown in FIG. 5, process 500 may include performing, based on whether the multiple images show the occurrence of the event, one or more actions that include at least one of discarding the multiple images based on determining that the multiple images show an occurrence of no event, or providing one or more of the multiple images to a platform for further processing or notification triggering based on determining that the multiple images show the occurrence of the event (block 550). For example, the camera (e.g., using processor 420, memory 430, storage component 440, input component 450, output component 460, communication interface 470, and/or the like) may perform, based on whether the multiple images show the occurrence of the event, one or more actions that include at least one of discarding the multiple images based on determining that the multiple images show an occurrence of no event, or providing one or more of the multiple images to a platform for further processing or notification triggering based on determining that the multiple images show the occurrence of the event, as described above.

Process 500 may include additional implementations, such as any single implementation or any combination of implementations described below and/or in connection with one or more other processes described elsewhere herein.

In some implementations, the camera may receive the set of instructions from another camera associated with another vehicle and may detect the indication based on receiving the set of instructions. In some implementations, the camera may transmit, to another camera associated with another vehicle, another set of instructions to cause the other camera to mark one or more other images as relevant based on detecting the indication or determining that the multiple images show the occurrence of the event.

In some implementations, the camera may identify, after identifying the corresponding types of the one or more objects, corresponding motions of the one or more objects in relation to each other or the vehicle across the multiple images, and may determine whether the multiple images show the occurrence of the event based on identifying the corresponding motions of the one or more objects. In some implementations, the camera may receive, from the one or more objects, telemetry data from corresponding sets of sensors associated with the one or more objects, wherein the one or more objects are one or more other vehicles, and may identify the corresponding motions of the one or more objects using the telemetry data in combination with processing the multiple images.

In some implementations, the camera may identify the one or more of the multiple images to be provided to the platform based on determining that the multiple images show the occurrence of the event, and may provide the one or more of the multiple images to the platform after identifying the one or more of the multiple images. In some implementations, the camera may request, from the user of the vehicle, input of a confirmation of the occurrence of the event based on determining that the multiple images show the occurrence of the event, may receive input of the confirmation after requesting input of the confirmation, and may provide the one or more of the multiple images to the platform after receiving the input.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
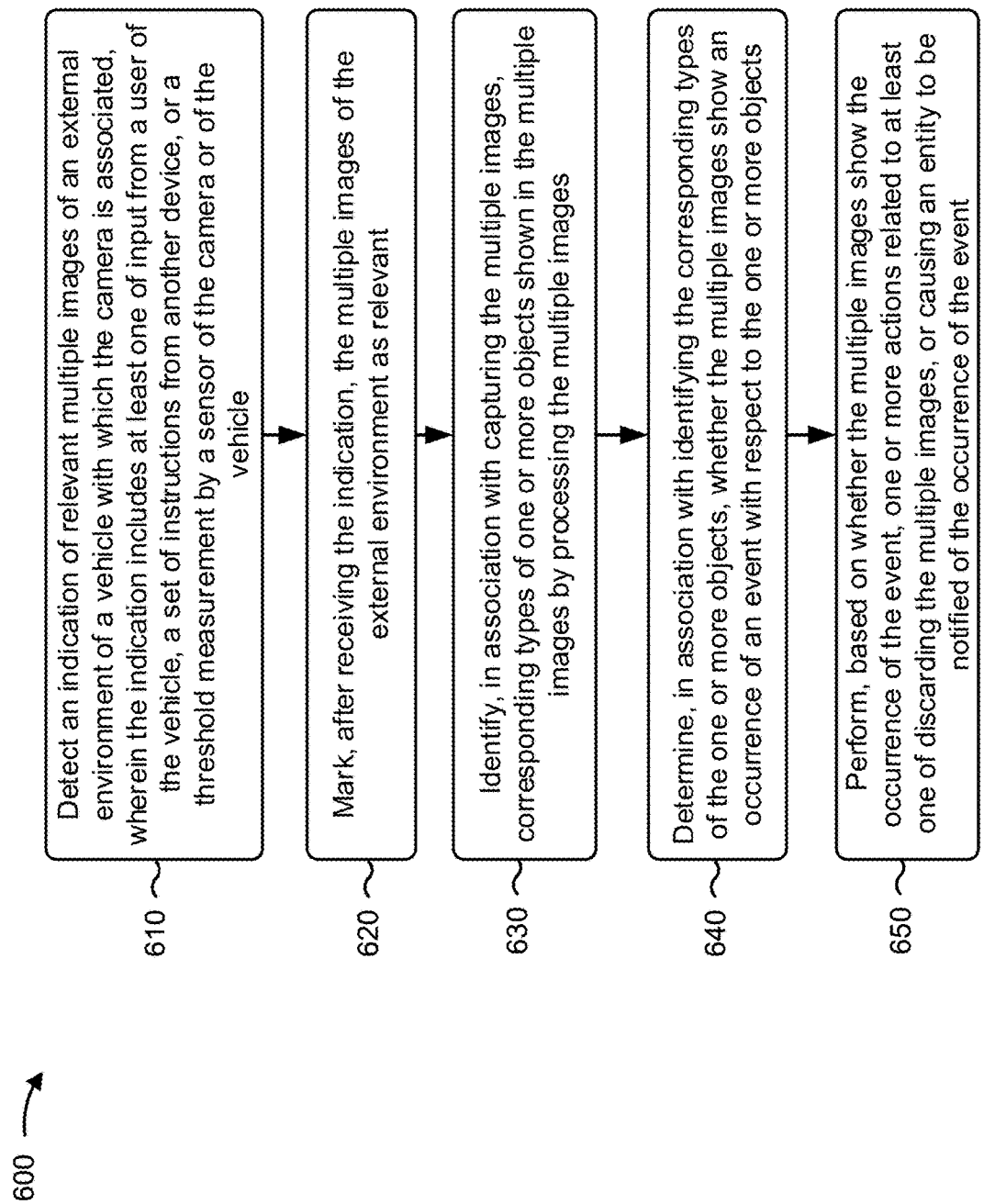

FIG. 6 is a flow chart of an example process 600 related to a vehicle behavior detection system. In some implementations, one or more process blocks of FIG. 6 may be performed by a camera (e.g., camera 102, camera 312, and/or the like). In some implementations, one or more process blocks of FIG. 5 may be performed by another device or a group of devices separate from or including the camera, such as a vehicle (e.g., vehicle 310), a user device (e.g., user device 320), an event processing platform (e.g., event processing platform 202, event processing platform 330, and/or the like), a server device (e.g., server device 340), and/or the like.

As shown in FIG. 6, process 600 may include detecting an indication of relevant multiple images of an external environment of a vehicle with which the camera is associated, wherein the indication includes at least one of input from a user of the vehicle, a set of instructions from another device, or a threshold measurement by a sensor of the camera or of the vehicle (block 610). For example, the camera (e.g., using processor 420, input component 450, communication interface 470, and/or the like) may detect an indication of relevant multiple images of an external environment of a vehicle with which the camera is associated, as described above. In some aspects, the indication includes at least one of input from a user of the vehicle, a set of instructions from another device, or a threshold measurement by a sensor of the camera or of the vehicle.

As further shown in FIG. 6, process 600 may include marking, after receiving the indication, the multiple images of the external environment as relevant (block 620). For example, the camera (e.g., using processor 420, input component 450, and/or the like) may mark, after receiving the indication, the multiple images of the external environment as relevant, as described above.

As further shown in FIG. 6, process 600 may include identifying, in association with capturing the multiple images, corresponding types of one or more objects shown in the multiple images by processing the multiple images (block 630). For example, the camera (e.g., using processor 420 and/or the like) may identify, in association with capturing the multiple images, corresponding types of one or more objects shown in the multiple images by processing the multiple images, as described above.

As further shown in FIG. 6, process 600 may include determining, in association with identifying the corresponding types of the one or more objects, whether the multiple images show an occurrence of an event with respect to the one or more objects, (block 640). For example, the camera (e.g., using processor 420 and/or the like) may determine, in association with identifying the corresponding types of the one or more objects, whether the multiple images show an occurrence of an event with respect to the one or more objects, as described above.

As further shown in FIG. 6, process 600 may include performing, based on whether the multiple images show the occurrence of the event, one or more actions related to at least one of discarding the multiple images, or causing an entity to be notified of the occurrence of the event (block 650). For example, the camera (e.g., using processor 420, memory 430, storage component 440, input component 450, output component 460, communication interface 470, and/or the like) may perform, based on whether the multiple images show the occurrence of the event, one or more actions related to at least one of discarding the multiple images, or causing an entity to be notified of the occurrence of the event, as described above.

Process 600 may include additional implementations, such as any single implementation or any combination of implementations described below and/or in connection with one or more other processes described elsewhere herein.

In some implementations, the camera may determine a score for the event using a machine learning model after determining that the multiple images show the occurrence of the event, wherein the score indicates a priority level of the event, and may perform the one or more actions based on whether the score satisfies a threshold. In some implementations, the camera may provide, based on the score satisfying the threshold, one or more of the multiple images to a platform associated with notifying the entity, within a threshold amount of time after determining that the multiple images show the occurrence of the event.

In some implementations, the camera may determine that the score fails to satisfy the threshold, after determining the score, and may determine to wait to provide the one or more of the multiple images until the camera is connected to an un-metered wireless connection based on the score failing to satisfy the threshold. In some implementations, the camera may receive, from a platform associated with notifying the entity, an update to an image processing technique or to a machine learning model used by the camera after providing one or more of the multiple images to the platform, wherein the image processing technique or the machine learning model are associated with identifying the occurrence of the event, wherein the update is based on a result of the platform confirming whether the multiple images show the occurrence of the event, and may install the update after receiving the update.

In some implementations, the camera may classify the event into a classification after determining that the multiple images show the occurrence of the event and may provide, after classifying the event, one or more of the multiple images to a platform associated with notifying the entity, in association with metadata that identifies the classification. In some implementations, the camera may request video from vehicles in an area of the vehicle at a time when the multiple images are captured, and may receive the video from the vehicles based on requesting the video.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
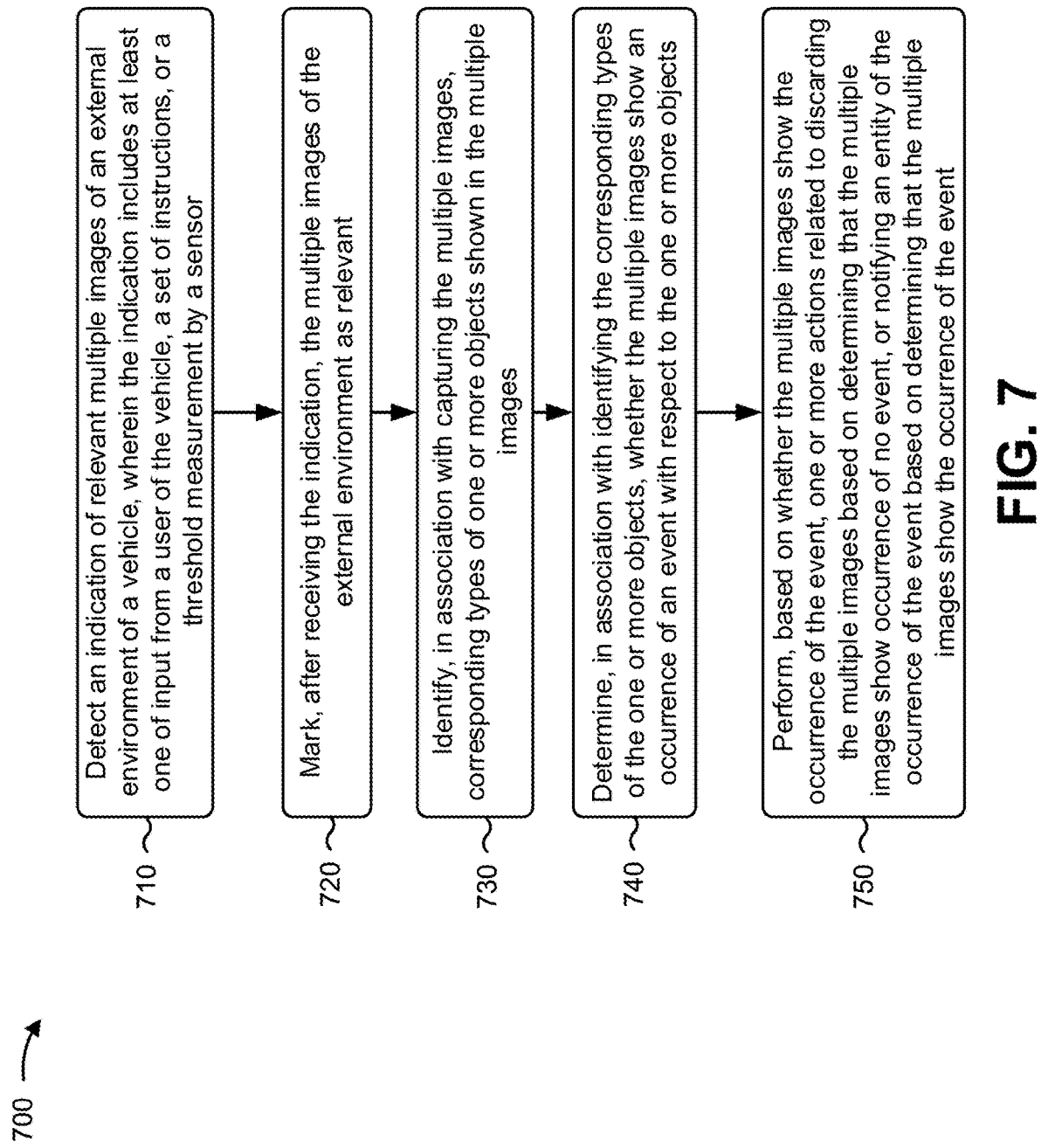

FIG. 7 is a flow chart of an example process 700 related to a vehicle behavior detection system. In some implementations, one or more process blocks of FIG. 7 may be performed by a system (e.g., a system of camera 102, 312 and event processing platform 202, 330). In some implementations, one or more process blocks of FIG. 7 may be performed by another device or a group of devices separate from or including the system, such as a vehicle (e.g., vehicle 310), a camera (e.g., camera 102, camera 312, and/or the like), a user device (e.g., user device 320), an event processing platform (e.g., event processing platform 330), and/or a server device (e.g., server device 340).

As shown in FIG. 7, process 700 may include detecting an indication of relevant multiple images of an external environment of a vehicle, wherein the indication includes at least one of input from a user of the vehicle, a set of instructions, or a threshold measurement by a sensor (block 710). For example, the system (e.g., using computing resource 334, processor 420, input component 450, communication interface 470, and/or the like) may detect an indication of relevant multiple images of an external environment of a vehicle, as described above. In some implementations, the indication includes at least one of input from a user of the vehicle, a set of instructions, or a threshold measurement by a sensor.

As further shown in FIG. 7, process 700 may include marking, after receiving the indication, the multiple images of the external environment as relevant (block 720). For example, the system (e.g., using computing resource 334, processor 420, input component 450, and/or the like) may capture, after receiving the indication, the multiple images of the external environment, as described above.

As further shown in FIG. 7, process 700 may include identifying, in association with capturing the multiple images, corresponding types of one or more objects shown in the multiple images (block 730). For example, the system (e.g., using computing resource 334, processor 420 and/or the like) may identify, in association with capturing the multiple images, corresponding types of one or more objects shown in the multiple images, as described above.

As further shown in FIG. 7, process 700 may include determining, in association with identifying the corresponding types of the one or more objects, whether the multiple images show an occurrence of an event with respect to the one or more objects (block 740). For example, the system (e.g., using computing resource 334, processor 420, and/or the like) may determine, in association with identifying the corresponding types of the one or more objects, whether the multiple images show an occurrence of an event with respect to the one or more objects, as described above.

As further shown in FIG. 7, process 700 may include performing, based on whether the multiple images show the occurrence of the event, one or more actions related to discarding the multiple images based on determining that the multiple images show occurrence of no event, or notifying an entity of the occurrence of the event based on determining that the multiple images show the occurrence of the event (block 750). For example, the system (e.g., using computing resource 334, processor 420, memory 430, storage component 440, input component 450, output component 460, communication interface 470, and/or the like) may perform, based on whether the multiple images show the occurrence of the event, one or more actions related to discarding the multiple images based on determining that the multiple images show occurrence of no event, or notifying an entity of the occurrence of the event based on determining that the multiple images show the occurrence of the event, as described above.

Process 700 may include additional implementations, such as any single implementation or any combination of implementations described below and/or in connection with one or more other processes described elsewhere herein.

In some implementations, the system may receive the set of instructions from a camera associated with another vehicle and may detect the indication based on receiving the indication. In some implementations, the system may transmit, to a camera associated with another vehicle, another set of instructions to cause the other camera to capture one or more other images based on detecting the indication or determining that the multiple images show the occurrence of the event.

In some implementations, the system may determine a score for the event using a machine learning model after determining that the multiple images show the occurrence of the event, wherein the score indicates a priority level of the event, and may perform the one or more actions based on whether the score satisfies a threshold. In some implementations, system may provide one or more of the multiple images to a device, of the one or more devices, within a threshold amount of time after determining that the multiple images show the occurrence of the event based on the score satisfying the threshold. In some implementations, the system may determine that the score fails to satisfy the threshold after determining the score, and may determine to wait to provide one or more of the multiple images until a device, of the one or more devices, is connected to an un-metered wireless connection based on the score failing to satisfy the threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   detecting, by a camera associated with a vehicle, an indication of relevant multiple images of an external environment of the vehicle,
      wherein the indication includes at least one of:
         input from a user of the vehicle,
         a set of instructions from another device, or
         a threshold measurement by a sensor of the camera or of the vehicle;
   marking, by the camera and after receiving the indication, the multiple images of the external environment as relevant;
   identifying, by the camera and in association with capturing the multiple images, corresponding types of one or more objects shown in the multiple images using at least one of:
      an image processing technique, or
      a machine learning model;
   determining, by the camera and in association with identifying the corresponding types of the one or more objects, whether the multiple images show an occurrence of an event with respect to the one or more objects; and
   performing, by the camera and based on determining whether the multiple images show the occurrence of the event, one or more actions that include at least one of:
      discarding the multiple images based on determining that the multiple images show an occurrence of no event, or
      identifying, based on determining that the multiple images show the occurrence of the event, one or more images of the multiple images, and providing the one or more images to a platform for further processing or notification triggering after identifying the one or more images,
         wherein the one or more images show the event.

2. The method of claim 1, further comprising:
   receiving the set of instructions from another camera associated with another vehicle; and
   wherein detecting the indication comprises:
      detecting the indication based on receiving the set of instructions.

3. The method of claim 1, further comprising:
   transmitting, to another camera associated with another vehicle, another set of instructions to cause the other camera to mark one or more other images as relevant based on detecting the indication or determining that the multiple images show the occurrence of the event.

4. The method of claim 1, further comprising:
   identifying, after identifying the corresponding types of the one or more objects, corresponding motions of the one or more objects in relation to each other or the vehicle across the multiple images; and
   wherein determining whether the multiple images show the occurrence of the event comprises:
      determining whether the multiple images show the occurrence of the event based on identifying the corresponding motions of the one or more objects.

5. The method of claim 4, further comprising:
   receiving, from the one or more objects, telemetry data from corresponding sets of sensors associated with the one or more objects,
      wherein the one or more objects are one or more other vehicles; and
   wherein identifying the corresponding motions of the one or more objects comprises:
      identifying the corresponding motions of the one or more objects using the telemetry data in combination with processing the multiple images.

6. The method of claim 1, wherein performing the one or more actions comprises:
   requesting, from the user of the vehicle, input of a confirmation of the occurrence of the event based on determining that the multiple images show the occurrence of the event;
   receiving input of the confirmation after requesting input of the confirmation; and
   providing the one or more images to the platform after receiving the input.

7. The method of claim 1, wherein the one or more images are identified based on a threshold time period from a time period associated with the event.

8. A camera, comprising:
   one or more memories; and
   one or more processors, communicatively coupled to the one or more memories, to:
      detect an indication of relevant multiple images of an external environment of a vehicle with which the camera is associated,
         wherein the indication includes at least one of:
            input from a user of the vehicle,
            a set of instructions from another device, or
            a threshold measurement by a sensor of the camera or of the vehicle;
      mark, after receiving the indication, the multiple images of the external environment as relevant;
      identify, in association with capturing the multiple images, corresponding types of one or more objects shown in the multiple images by processing the multiple images;
      determine, in association with identifying the corresponding types of the one or more objects, whether the multiple images show an occurrence of an event with respect to the one or more objects; and
      perform, based on determining whether the multiple images show the occurrence of the event, one or more actions related to at least one of:
         discarding the multiple images, or
         identify, based on determining that the multiple images show the occurrence of the event, one or more images of the multiple images, and provide the one or more images to an entity for further processing or notification triggering after identifying the one or more images,
            wherein the one or more images show the event.

9. The camera of claim 8, wherein the one or more processors, when performing the one or more actions, are to:
   determine a score for the event using a machine learning model after determining that the multiple images show the occurrence of the event,
      wherein the score indicates a priority level of the event; and
   wherein the one or more processors, when performing the one or more actions, are to:
      perform the one or more actions based on whether the score satisfies a threshold.

10. The camera of claim 9, wherein the one or more processors, when performing the one or more actions, are to:
provide, based on the score satisfying the threshold, the one or more images to a platform associated with notifying the entity, within a threshold amount of time after determining that the multiple images show the occurrence of the event.

11. The camera of claim 9, wherein the one or more processors, when performing the one or more actions, are to:
determine that the score fails to satisfy the threshold after determining the score; and
determine to wait to provide the one or more of the multiple images until the camera is connected to an un-metered wireless connection based on the score failing to satisfy the threshold.

12. The camera of claim 8, wherein the one or more processors are further to:
receive, from a platform associated with notifying the entity, an update to an image processing technique or to a machine learning model used by the camera,
wherein the image processing technique or the machine learning model are associated with identifying the occurrence of the event,
wherein the update is based on a result of the platform confirming whether the multiple images show the occurrence of the event; and
install the update after receiving the update.

13. The camera of claim 8, wherein the one or more processors, when performing the one or more actions, are to:
classify the event into a classification after determining that the multiple images show the occurrence of the event; and
provide, after classifying the event, the one or more images to a platform associated with notifying the entity, in association with metadata that identifies the classification.

14. The camera of claim 8, wherein the one or more processors are further to:
request video from vehicles in an area of the vehicle at a time when the multiple images are captured; and
receive the video from the vehicles based on requesting the video.

15. A system, comprising:
one or more devices to:
detect an indication of relevant multiple images of an external environment of a vehicle,
wherein the indication includes at least one of:
input from a user of the vehicle,
a set of instructions, or
a threshold measurement by a sensor;
mark, after receiving the indication, the multiple images of the external environment as relevant;
identify, in association with capturing the multiple images, corresponding types of one or more objects shown in the multiple images;
determine, in association with identifying the corresponding types of the one or more objects, whether the multiple images show an occurrence of an event with respect to the one or more objects; and
perform, based on determining whether the multiple images show the occurrence of the event, one or more actions related to:
discarding the multiple images based on determining that the multiple images show occurrence of no event, or
identifying, based on determining that the multiple images show the occurrence of the event, one or more images of the multiple images, and providing the one or more images for further processing or notification triggering after identifying the one or more images,
wherein the one or more images show the event.

16. The system of claim 15, wherein the one or more devices are further to:
receive the set of instructions from a camera associated with another vehicle; and
wherein the one or more devices, when detecting the indication, are to:
detect the indication based on receiving the indication.

17. The system of claim 15, wherein the one or more devices are further to:
transmit, to a camera associated with another vehicle, another set of instructions to cause the other camera to mark one or more other images as relevant based on detecting the indication or determining that the multiple images show the occurrence of the event.

18. The system of claim 15, wherein the one or more devices, when performing the one or more actions, are to:
determine a score for the event using a machine learning model after determining that the multiple images show the occurrence of the event,
wherein the score indicates a priority level of the event; and
wherein the one or more devices, when performing the one or more actions, are to:
perform the one or more actions based on whether the score satisfies a threshold.

19. The system of claim 18, wherein the one or more devices, when performing the one or more actions, are to:
provide the one or more images within a threshold amount of time after determining that the multiple images show the occurrence of the event based on the score satisfying the threshold.

20. The system of claim 18, wherein the one or more devices, when performing the one or more actions, are to:
determine that the score fails to satisfy the threshold after determining the score; and
determine to wait to provide the one or more images until a device, of the one or more devices, is connected to an un-metered wireless connection based on the score failing to satisfy the threshold.

* * * * *